UNITED STATES PATENT OFFICE.

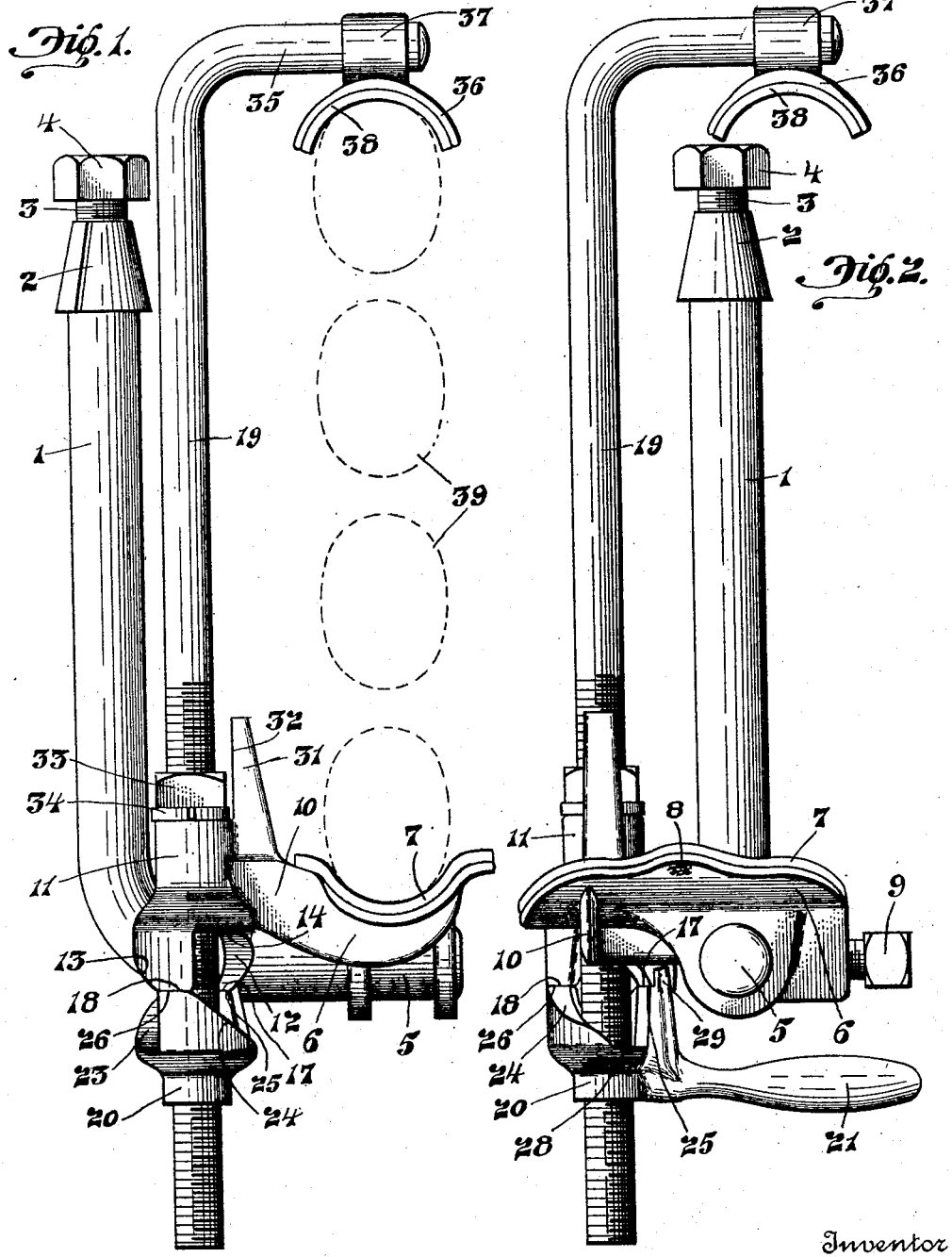

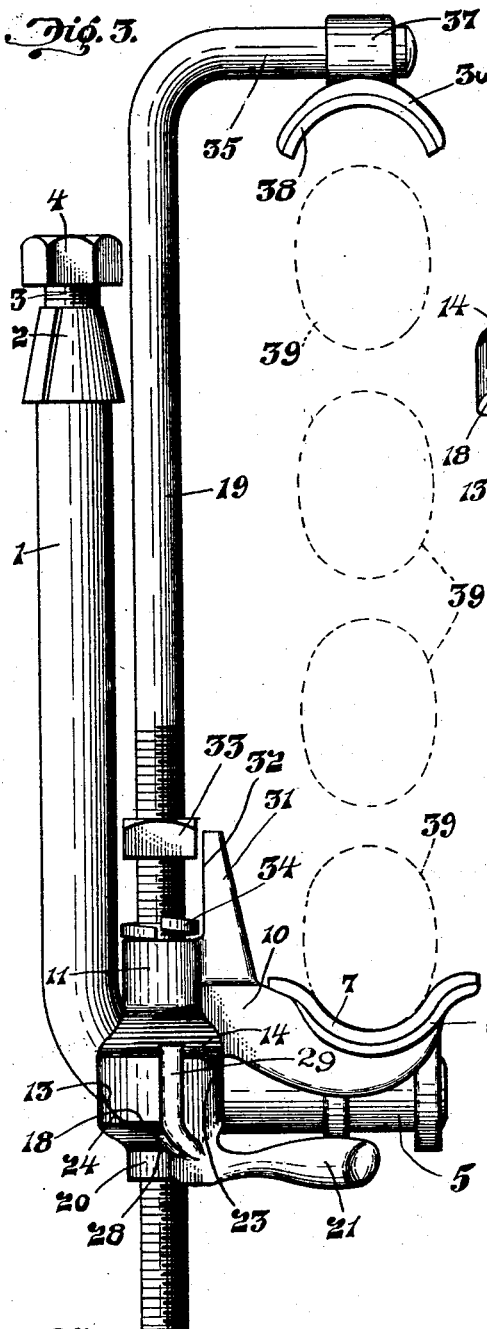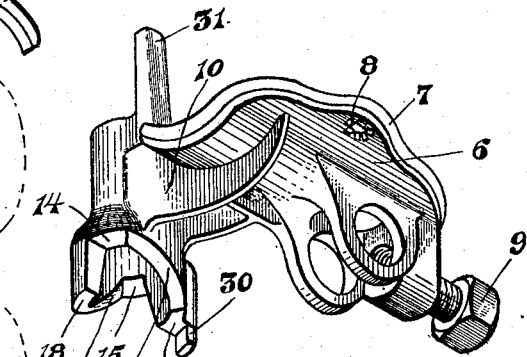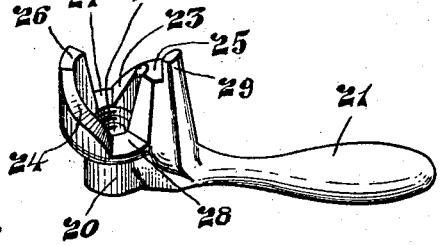

HARRY B. WHITE, OF CANTON, OHIO, ASSIGNOR TO THE GILLIAM MANUFACTURING COMPANY, OF CANTON, OHIO, A CORPORATION OF OHIO.

BOW REST AND CLAMPING DEVICE.

1,220,306.   Specification of Letters Patent.   Patented Mar. 27, 1917.

Application filed April 14, 1915. Serial No. 21,209.

*To all whom it may concern:*

Be it known that I, HARRY B. WHITE, a citizen of the United States, residing at Canton, in the county of Stark and State of Ohio, have invented a new and useful Bow Rest and Clamping Device, of which the following is a specification.

My invention relates to new and useful improvements in bow rests and clamping devices, and is especially adapted for use for holding the folding tops of automobiles and other vehicles when the tops are lowered.

The object of the present invention is to provide a bow rest and clamping device which may be readily adjusted to suit the position of the bows.

A further object is to provide a simple, inexpensive and effective device of the character referred to.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the accompanying drawing:

Figure 1 is a side elevation of my bow rest and clamp showing in dotted lines the bows of a vehicle top clamped therein.

Fig. 2 is a front elevation of the same, showing the clamping member clamped in the open position.

Fig. 3 is a side elevation of the device in position preparatory to clamping the bows of a vehicle top.

Fig. 4 is a detail perspective view of the rest.

Fig. 5 is a detail perspective view of the actuating lever and cam.

Similar numerals of reference indicate corresponding parts throughout the several figures of the drawings.

Referring more especially to the construction illustrated in the accompanying drawings, the numeral 1 indicates the usual supporting rod which is connected to and depends from the ordinary bracket provided on automobiles and other vehicles for the purpose of supporting the bow rest. The split conical collar 2 is mounted upon the screw-threaded portion 3 of the rod and together with the nut 4 is utilized for the purpose of attaching the supporting rod 1 to the usual bracket (not shown) upon the vehicle. It will, of course, be understood that the conical collar 2 may be used as shown in the drawings or may be inverted to accommodate different forms of brackets. As all of these parts are of the ordinary construction and have no specific bearing upon the invention disclosed herein it is not thought necessary to further describe these parts in detail.

The lower extremity of the supporting rod 1 is provided with a horizontal arm 5 which is preferably formed integral with the rod 1. Adjustably mounted for lateral movement upon the arm 5 of the supporting rod is the bracket 6, the upper face of said bracket being channeled and covered with a pad 7, of leather or similar material, which may be attached thereto as by rivets 8, thus forming a rest upon which the lowermost bow of the vehicle top will be located when the top is in the folded position. A set screw 9 is located through the bracket for the purpose of attaching the bracket, in any desired position, upon the horizontal arm 5.

The bracket 6 is provided with an arm 10 located in a horizontal plane and preferably extending at right angles to said bracket, said arm carrying the vertical tubular portion 11, which is provided at its lower extremity with the cam faces 12 and 13, said cam faces terminating at their upper extremities in the horizontal surfaces 14 and 15 respectively, and at their lower extremities in the horizontal faces 17 and 18 respectively.

The clamping rod 19 is located through the tubular portion 11 of the bracket and is arranged to be clamped against movement with relation to the bracket as will be hereinafter described and pointed out.

The lower portion of the rod 19 is screw-threaded and the tubular portion 20 of the actuating lever 21 is mounted thereon by means of the internal screw-threads 22 provided therein. The tubular portion 20 of the actuating lever is provided with the inclined cam faces 23 and 24 adapted to engage the inclined faces 12 and 13 respectively, of the bracket, horizontal faces 25 and 26 respectively being provided at the upper extremities of said inclined faces, and horizontal faces 27 and 28 respectively being provided at the lower extremities of said inclined faces.

A lug 29 is provided upon the tubular portion of the locking member and arranged to contact with the lug 30 upon the tubular portion of the bracket when the operating lever is moved into the locked position, thus preventing any further movement of said operating lever.

An upwardly disposed finger 31 is provided upon the bracket 6, said finger having an inner flat face 32 located parallel to the rod 19 and adapted to prevent rotation of the square collar 33 which is provided upon said rod. A resilient member, preferably a split spring washer 34, is provided around the rod 19 between the collar 33 and the tubular portion of the bracket.

The upper end of the rod 19 is preferably bent or curved outwardly to form a horizontal arm 35 on which is adjustably mounted the clamp 36. This clamp preferably comprises a collar 37 and the curved plate 36 formed integral therewith and arranged in an inverted position. A pad 38 of leather or equivalent material is provided upon the inner curved face of the clamp.

When it is desired to clamp the bows of the vehicle top the bows as indicated in dotted lines at 39 in Fig. 3 are lowered upon the rest 7 and the rod 19 is elevated, the inclined cam faces 23 and 24 upon the actuating lever contacting with the inclined cam faces 13 and 12 respectively upon the tubular portion of the bracket. The several parts will then all be in the relative positions indicated in Fig. 3 of the drawings. The actuating lever is then operated, moving the tubular portion thereof into the position shown in Fig. 1 of the drawings, the upper flat faces 25 and 26 thereon engaging the lower flat faces 17 and 18 respectively upon the tubular portion of the bracket, the lugs 29 and 30 being brought into contact to prevent any further movement of the actuating lever. The square collar 33 will thus be drawn against the resilient member 34 and the rod 19 will thus be held rigidly as shown in Fig. 1 of the drawing. The bows as indicated at 39 will be firmly clamped between the clamping member 36 and the rest 7. When the vehicle top is in the raised position the arm 35 of the rod 34 may be swung to one side as shown in Fig. 2 of the drawings and the actuating lever moved into the clamping position, thus holding the rod 19 firmly against movement.

Although the drawings and above specification disclose the best mode in which I have contemplated embodying my invention I desire to be not limited to the details of such disclosure, for in the further practical application of my invention, many changes in form and construction may be made, as circumstances require or experience suggests, without departing from the spirit of the invention, within the scope of the appended claims.

I claim:

1. In a device of the character described, the combination of a support adapted to be arranged at one side of a vehicle and having a rest movable toward and from the vehicle thereon, means for securing the rest to said support, the said rest being provided with an arm extending rearwardly therefrom and arranged at one side of said support, the arm being formed with an opening, a rod slidably and rotatably mounted in said opening and provided with an arm at its upper end, a plate mounted on said last mentioned arm and arranged to coöperate with the rest to support a set of top bows in folded position, a nut screw threaded on said rod above the arm on said rest, means connected to said rest and adapted to contact with and prevent rotation of said nut, a clamping lever screw threaded on said rod below said arm and arranged to coöperate with said nut to secure the rod to said arm in operative position, a cam face provided upon said clamping lever and arranged to contact with the under side of the arm on said rest and a spring interposed between said nut and the arm on said rest arranged to be put under tension when the clamping lever is operated.

2. In a device of the character described, the combination of a support adapted to be arranged at one side of a vehicle and having a rest movable toward and from the vehicle thereon, means for securing the rest to said support, the said rest being provided with an arm extending rearwardly therefrom and arranged at one side of said support, the arm being formed with an opening, a rod slidably and rotatably mounted in said opening and provided with an arm at its upper end, a plate mounted on the last mentioned arm and arranged to coöperate with the rest to support a set of top bows in folded position, a pair of nuts screw-threaded on said rod and arranged above and below the arm on said rest and coöperating with each other to secure the rod thereto in operative position, means connected to said rest and adapted to contact with and prevent rotation of the upper nut, a cam face provided upon the underside of the arm on said rest and a cam face provided upon the adjacent nut for locking the latter against turning movement, and a spring interposed between the nut and the arm on said rest arranged to be put under tension when the first mentioned nut is operated.

3. In a device of the character described, the combination of a supporting member having a rest arranged to support the bows of a vehicle top, a rod movably mounted on said member and provided with a clamp arranged to coöperate with the rest to support the bows, a collar screw threaded on said rod and arranged above said member, said collar being provided with a flat face, a guide finger provided upon said member and located parallel to said rod, said guide finger being arranged to contact with the flat face upon said collar to prevent said collar from rotating upon said rod, a clamping device mounted upon said rod below said member and arranged to coöperate with the collar when tightened to draw the rod downwardly and rigidly secure it to said member and a yieldable device interposed between the collar and member tending to normally elevate the rod.

4. In a device of the character described, the combination of a support adapted to be arranged at one side of the vehicle and having a rest movable toward and from the vehicle thereon, means for securing the rest to said support, the said rest being provided with an arm extending rearwardly therefrom and arranged at one side of said support, a tubular portion provided upon said arm, a rod slidably and rotatably mounted in said tubular portion and provided with an arm at its upper end, a plate mounted upon said last mentioned arm and arranged to coöperate with the rest to support a set of top bows in folded position, a nut screw-threaded on said rod above said tubular portion, spaced, laterally disposed lugs provided upon said tubular portion, each of said lugs provided with an inclined side face, a clamping lever screw-threaded on said rod below said tubular portion and arranged to coöperate with said nut to secure the rod to said arm in operative position, spaced lugs provided upon said clamping lever, each of the lugs upon said clamping lever being provided with an inclined face arranged to engage the inclined faces of the lugs upon the tubular portion of said rest when said device is in the open position, the extremities of the lugs upon said clamping lever being arranged to engage the extremities of the lugs upon the tubular portion when said device is in the clamped position, a stop lug provided upon said tubular portion, a second stop lug provided upon said clamping lever, said stop lugs adapted to contact when the device is in the clamped position and a spring interposed between said nut and the tubular portion of said rest arranged to be put under tension when the clamping member is operated.

5. In a device of the character described, the combination of a support adapted to be arranged at one side of the vehicle and having a rest movable toward and from the vehicle thereon, means for securing the rest to said support, the said rest being provided with an arm extending rearwardly therefrom and arranged at one side of said support, a tubular portion provided upon said arm, a rod slidably and rotatably mounted in said tubular portion and provided with an arm at its upper end, a plate mounted upon said last mentioned arm and arranged to coöperate with the rest to support a set of top bows in folded position, a nut screw-threaded on said rod above said tubular portion, spaced, laterally disposed lugs provided upon said tubular portion, each of said lugs provided with an inclined side face, a clamping lever screw-threaded on said rod below said tubular portion and arranged to coöperate with said nut to secure the rod to said arm in operative position, spaced lugs provided upon said clamping lever, each of the lugs upon said clamping lever being provided with an inclined face arranged to engage the inclined faces of the lugs upon the tubular portion of said rest when said device is in the open position, the extremities of the lugs upon said clamping lever being arranged to engage the extremities of the lugs upon the tubular portion when said device is in the clamped position, a finger provided upon said rest and disposed parallel to said rod, said finger adapted to engage one of the faces of said nut to prevent said nut from rotating upon said rod and a spring interposed between said nut and the tubular portion of said rest arranged to be put under tension when the clamping member is operated.

In testimony that I claim the above, I have hereunto subscribed my name in the presence of two witnesses.

HARRY B. WHITE.

Witnesses:
S. G. ZIMMERMAN,
E. A. RIGGALL.

Copies of this patent may be obtained for five cents each, by addressing the "Commissioner of Patents, Washington, D. C."